US009054863B2

(12) United States Patent
Sin et al.

(10) Patent No.: US 9,054,863 B2
(45) Date of Patent: Jun. 9, 2015

(54) INDUSTRIAL PROTOCOL SYSTEM AUTHENTICATION AND FIREWALL

(75) Inventors: Ng Pei Sin, Singapore (SG); James A. Sinclair, Cleveland Heights, OH (US); Taryl Jasper, South Euclid, OH (US)

(73) Assignee: Rockwell Automation Asia Pacific Business Center PTE. LTD., Singapore (SG)

( * ) Notice: Subject to any disclaimer, the term of this patent is extended or adjusted under 35 U.S.C. 154(b) by 269 days.

(21) Appl. No.: 13/603,102

(22) Filed: Sep. 4, 2012

(65) Prior Publication Data

US 2014/0064482 A1  Mar. 6, 2014

(51) Int. Cl.
*H04L 9/00* (2006.01)
*H04L 9/08* (2006.01)
*H04L 9/32* (2006.01)

(52) U.S. Cl.
CPC ............ *H04L 9/0891* (2013.01); *H04L 9/3271* (2013.01)

(58) Field of Classification Search
CPC .................................. G06F 21/00; G09C 5/00
USPC .................................. 380/44, 282; 726/20, 5
See application file for complete search history.

(56) References Cited

U.S. PATENT DOCUMENTS 5,937,066 A *  8/1999  Gennaro et al. ............... 380/286
7,500,272 B2 *  3/2009  Wheeler et al. ................. 726/34
2002/0023217 A1 *  2/2002  Wheeler et al. ............... 713/171
2004/0139028 A1 *  7/2004  Fishman et al. ................. 705/67
2008/0134311 A1    6/2008  Medvinsky et al.
2010/0293378 A1 * 11/2010  Xiao et al. ..................... 713/168
2013/0290706 A1 * 10/2013  Socky et al. ................... 713/158

OTHER PUBLICATIONS

"Cryptographic Algorithms and Key Sizes for Personal Identity Verification" —Polk et al., NIST Dec. 2010 http://csrc.nist.gov/publications/nistpubs/800-78-3/sp800-78-3.pdf.*
"J-Pake: Authenticated Key Exchange Without PKI" —Hao et al., Jun. 2006 https://eprint.iacr.org/2010/190.pdf.*
TLS Handshake Protocol.

* cited by examiner

*Primary Examiner* — Randy Scott
(74) *Attorney, Agent, or Firm* — Boyle Fredrickson, S.C.

(57) ABSTRACT

Aspects of the present invention provide machines, systems, and methods in which industrial control systems may be secured from compromise and/or disruption via authentication and firewall. In particular, an industrial controller may: randomly generate an exchange key and send the exchange key to a client device in response to a transaction request originating from the client device; combine the exchange key with a locally stored pass key to produce an authentication code; and compare a challenge key received from the client device to the authentication code to determine a match between the challenge key and the authentication code. A successful match between the challenge key and the authentication code may allow the client device to further access the industrial controller using a common industrial protocol (CIP), and a failed match between the challenge key and the authentication code may prevent the client device from further access to the industrial controller.

20 Claims, 5 Drawing Sheets

INDUSTRIAL PROTOCOL SYSTEM AUTHENTICATION AND FIREWALL

BACKGROUND OF THE INVENTION

The present invention relates to industrial control systems for controlling processes and machinery, and, in particular, to an authentication and firewall for industrial control systems.

Industrial controllers, such as programmable logic controllers (PLC's), are specialized electronic computer systems having processors and memories used in industrial control systems for the control of industrial processes and machinery. Industrial controllers are often used in factory environments, and are typically constructed to be substantially more robust against shock and damage and to better resist external contaminants and extreme environmental conditions. The processors and operating systems are optimized for real-time control and execute languages allowing ready customization of programs to comport with a variety of different controller applications and programs, In contrast to more conventional computer systems, industrial control systems generally provide greater flexibility and hardware configuration (to match a variety of different control applications and programs) and have a higher standard of reliability and predictability necessary for real-time control of complex machinery. Greater flexibility in hardware configuration is typically obtained by a modular and distributed construction in which an, industrial control system may be assembled of multiple modules, for example, a PLC connected to an arbitrary number of I/O modules, the latter providing communication with various switches and sensors on the machine.

The various components of the industrial control system may be connected together by means of a high-speed "control network" using a variety of special protocols that ensure predictable, timely and reliable communication of control data For example, control network protocols may employ "connected messaging" in which the bandwidth of the network and buffer space is pre-allocated to dedicated "connections" to prevent lost or unpredictably delayed data transfer that can occur in standard network protocols such as Ethernet.

Protocol as used herein refers not simply to the format of the data (e.g., baud rate, the number of bits, error correction codes and the like), but also to the steps of establishing a connection, assigning addresses to connections, handling connection errors, sending acknowledgment messages and the like. Common Industrial Protocol (CIP) is a media independent industrial protocol for industrial automation applications supported by the Open DeviceNet Vendors Association (ODVA). CIP encompasses a comprehensive suite of messages and services for the collection of manufacturing automation applications, including control, safety, synchronization, motion, configuration and other information. Application extensions to CIP include CIP Safety, providing a communication between nodes such as safety I/O blocks, safety interlock switches, safety light curtains and safety PLCs in safety applications up to Safety Integrity Level (SIL) 3 according to IEC 61508 standards, CIP Motion, allowing integration of field devices and motion drives on the same network thereby eliminating the need for a separate motion optimized network, and CIP Sync, a time synchronization extension to CIP based on the recent IEEE-1588 standard—Precision Clock Synchronization Protocol for Networked Measurement and Control Systems—providing increased control coordination for sequencing demanding events recording, distributed motion control and other distributed applications. CIP maximizes compatibility among devices in an industrial system, and typical control networks implementing CIP include EtherNet/IP, DeviceNet, ControlNet and similar networks whose specifications are published and whose protocols are used broadly by a number of manufacturers and suppliers.

External clients or client devices, such as terminals having a processor, memory, keyboard, mouse and display, may typically be connected to the industrial controller through a user interface, such as a Universal Serial Bus (USB), whose specification is published and whose protocols are known. The client device, like the industrial controller, may also be connected to a Wide Area Network (WAN) or the Internet through a switch or gateway. Often, the client devices must communicate with industrial controllers to implement a variety of tasks, such as starting, stopping, updating, modifying, testing and/or monitoring the industrial controller, one or more I/O modules and/or one or more industrial processes or machines. However, CIP protocol does not actively authenticate the identity of connecting devices. Nor does CIP protocol authenticate the authority level of connecting devices. As a result, any requesting device that connects to the industrial controller may gain access to the industrial system and may compromise and/or disrupt the industrial system accordingly.

SUMMARY OF THE INVENTION

The present inventors have recognized that industrial control systems may be secured from compromise and/or disruption by using an authentication and firewall. As such, industrial control systems may be adequately protected from accidental and/or unauthorized intrusion.

Aspects of the present invention provide in one embodiment an industrial controller with a processor executing a program stored in a non-transitory computer-readable storage medium wherein the program instructs the processor to perform the following steps: (a) randomly generate an exchange key and send the exchange key to a client device in response to a transaction request originating from the client device; (b) combine the exchange key with a locally stored pass key to produce an authentication code; and (c) compare a challenge key received from the client device to the authentication code to determine a match between the challenge key and the authentication code. A successful match between the challenge key and the authentication code allows the client device to further access the industrial controller using a common industrial protocol. Conversely, a failed match between the challenge key and the authentication code prevents the client device from further access to the industrial controller.

The exchange key may be combined with the locally stored pass key using a cryptographic hash function, which may be the MD5 or the SHA-1 algorithm, for example. The industrial controller may communicate with the client device over a control network, such as EtherNet/IP, DeviceNet or ControlNet, or another type of network, such as Universal Serial Bus (USB).

The industrial controller may communicate with a plurality of I/O modules over a control network using CIP to thereby control an industrial process. The client device and the plurality of I/O modules may be on the same control network, such as EtherNet/IP, DeviceNet or ControlNet, and, after a successful match between the challenge key and the authentication code, the client device may alter a control program for controlling the industrial process.

For additional security, the industrial controller may add delay for a predetermined amount of time after sending the exchange key to the client device. In addition, the exchange key may be held valid for combining with a locally stored pass key to produce the authentication code for only a predetermined amount of time. Also, the industrial controller may stop sending exchange keys to the client device after a predetermined number of failed matches between the challenge key and the authentication code have occurred. In addition, the industrial controller may apply a decryption algorithm on an encrypted replacement pass key received from the client device to produce a decrypted replacement pass key; and replace the locally stored pass key with the decrypted replacement pass key following a successful match between the challenge key and the authentication code.

The industrial controller may also identify cryptographic capabilities of the client device based on information contained in the transaction request originating from the client device. The industrial controller -may also send to the client device identification of the strongest cryptographic capability supported by both the industrial controller and the client device based on information contained in the transaction request originating from the client device.

The industrial controller may limit the access it allows to the client device, such as by not allowing the complete available access unless multiple password, pass keys and authentication cycles occur. For example, the industrial controller may combine an exchange key with a different locally stored pass key to produce a different authentication code, wherein a successful match between the challenge key and the different authentication code allows the client device to further access different functionality of the industrial controller using CIP.

Another embodiment may provide a secure method for communicating with an industrial controller comprising: (a) randomly generating an exchange key and sending the exchange key to a client device in response to a transaction request originating from the client device; (b) combining the exchange key with a locally stored pass key to produce an authentication code; (c) comparing a challenge key received from the client device to the authentication code to determining a match between the challenge key and the authentication code; and (d) allowing the client device to further access the industrial controller using a common industrial protocol following a successful match between the challenge key and the authentication code, or preventing the client device from further access to the industrial controller following a failed match between the challenge key and the authentication code. The method could further comprising, for example: (a) applying a decryption algorithm on an encrypted replacement pass key received from the client device to produce a decrypted replacement pass key; and (b) replacing the locally stored pass key with the decrypted replacement pass key following a successful match between the challenge key and the authentication code.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a pad hereof, and in which there is shown a preferred embodiment of the invention. Such embodiment does not necessarily represent the full scope of the invention and reference is made, therefore, to the claims herein for interpreting the scope of the invention.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
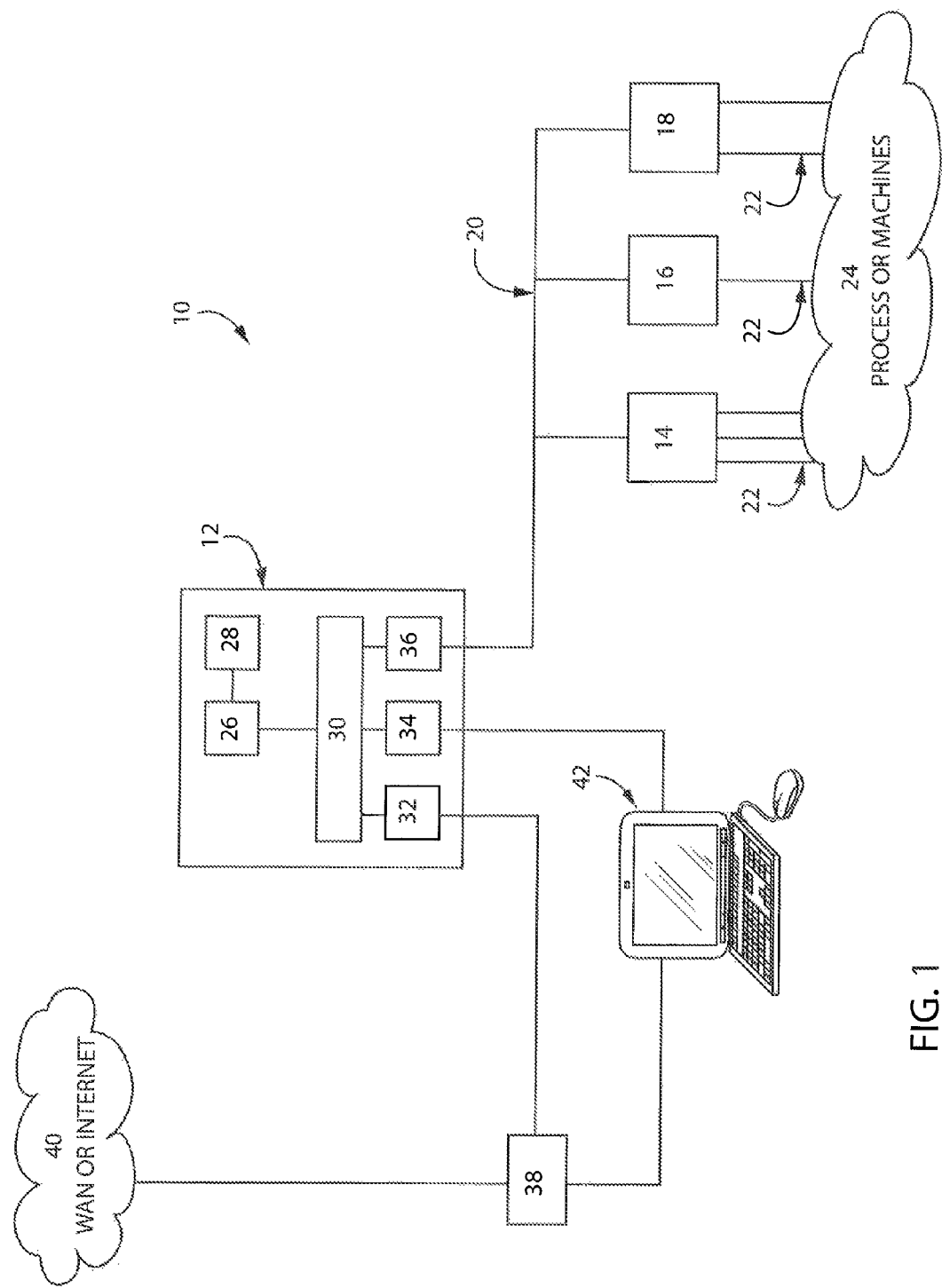
FIG. 1 is a block diagram of an industrial control system having an industrial controller, a client device and one or more I/O modules in accordance with an embodiment of the present invention.

Referring now to the drawings wherein like reference numbers correspond to similar components throughout the several views and, specifically, referring to FIG. 1, the present invention shall be described in the context of an industrial control system 10 having an industrial controller 12, a client device 42 and one or more I/O modules 14, 16 and 18 in accordance with an embodiment of the present invention. The industrial system 10 may be based on a Micro800™ Control System family which is commercially available from Rockwell Automation, Inc. The industrial controller 12 is coupled to the I/O modules 14, 16 and 18 via a control network 20. The control network 20 may be an EtherNet/IP, DeviceNet, ControlNet or other similar control network. In operation, the industrial controller 12 communicates with the I/O modules 14, 16 and 18 using CIP. In turn, the I/O modules 14, 16 and 18 communicate via electrical interfaces 22 with an industrial process or machines 24, which may include a plurality of actuators, motors, drives, etc. in a factory environment.

The industrial controller 12 includes a processor 26 that executes a program stored in a non-transitory computer-readable storage medium 28 to provide real-time control of the industrial process or machines 24. The non-transitory computer-readable storage medium 28 may be any ROM, RAM, flash memory, hard disk, floppy disc, optical disc, magnetic tape or other suitable storage de vice. The processor 26 may communicate with controller logic 30, which may in turn communicate with a plurality of network interfaces, including a first network interface 32, a second network interface 34 and a third network interface 36.

The first network interface 32 may couple to a switch or gateway 38 for access to a WAN or the Internet 40. The second network interface 34 may couple to the client device 42, which may be a desktop, laptop, tablet or other computer terminal or device having a processor, memory, keyboard and display. The second network interface 34 may couple, for example, via a Universal Serial Bus (USB) or other network type and may implement CIP. The client device 42 may also couple to the switch or gateway 38 for separate access to the WAN or the Internet 40. The third network interface 36 may couple to the control network 20 for communicating with the I/O modules 14, 16 and 18. The client device 42 may communicate with the industrial controller 12 to implement a variety of tasks, such as starting, stopping, updating, modifying, testing and/or monitoring the industrial controller 12, the I/O modules 14, 16 and 18 and/or the industrial process or machines 24. In an alternative embodiment, the client device 42 may also be on the same control network 20 as the I/O modules 14, 16 and 18, or the client device 42 may be in the WAN or the Internet 40.

Figure 2:
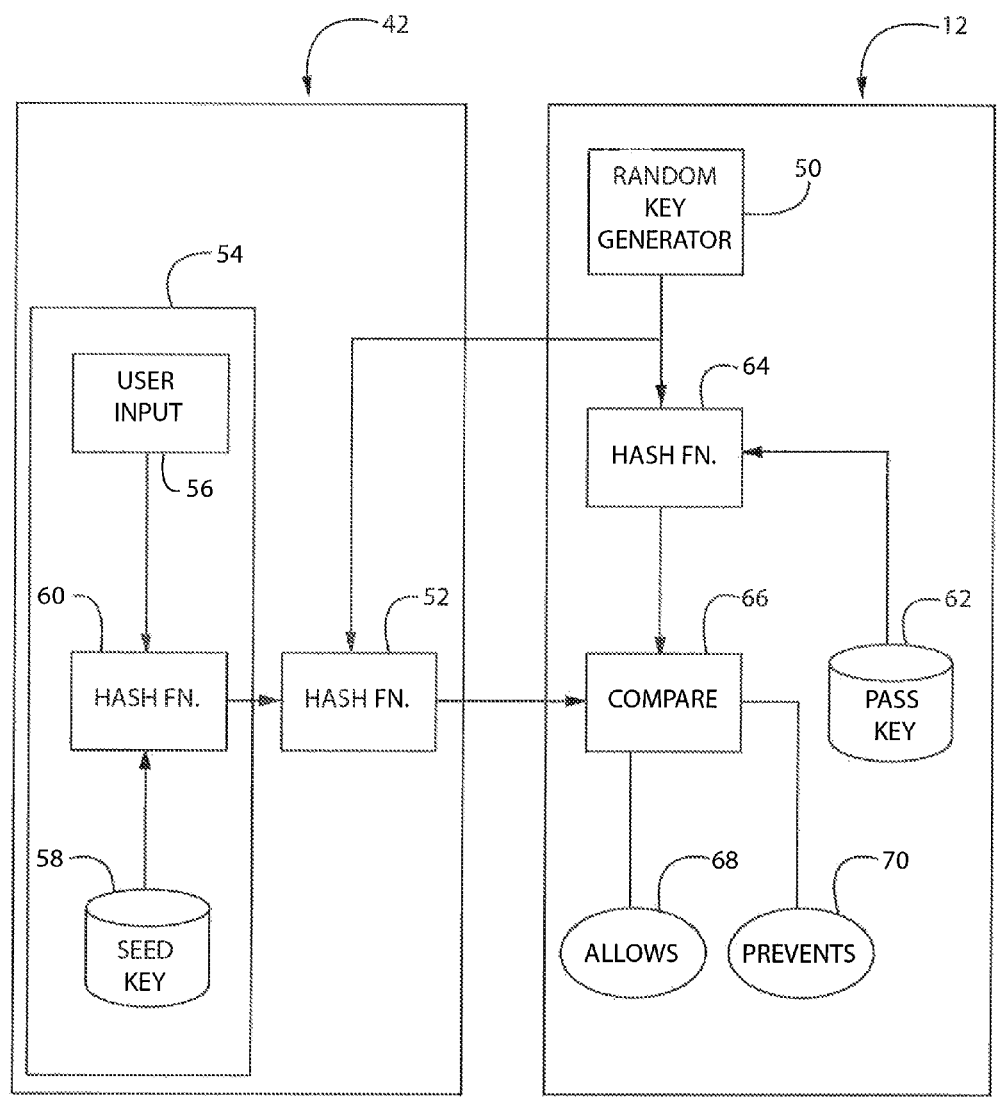
FIG. 2 is a logical diagram of a client device negotiating access with an industrial controller in accordance with an embodiment of the present invention.

Referring now to FIG. 2, a logical diagram of a client device negotiating access with an industrial controller in accordance with an embodiment of the present invention is shown. As such, and industrial controller may be secured from compromise and/or disruption via the implementation of an authentication procedure and firewall. The client device 42 begins by initiating a transaction to the industrial controller 12 which requests access. If the client device 42 is not already an established CIP connection, such as a CIP Class 3 connection whereby network packets are associated by a uniquely generated CIP connection ID, the industrial controller 12 may require authentication before allowing access, thereby implementing a firewall. Conversely, if the client device 42 has already been established as an authentic CIP connection, the industrial controller 12 may bypass repeating the authentication procedure.

In response to the transaction which requests access, the industrial controller 12 randomly generates an exchange key 50 and sends the exchange key to the client device 42. In a preferred embodiment, the industrial controller 12 may also identify the cryptographic capabilities of the client device 42 based on information contained in the transaction which requests access. Such information may include the types of cryptographic algorithms supported by the client device 42, the number of bits, etc. The industrial controller 12 may then send identification of the strongest cryptographic capability supported by both the industrial controller 12 and the client device 42, which is the cryptographic capability that the industrial controller 12 will require before allowing access, along with sending the exchange key.

The client device 42 in turn combines the exchange key with a pass key to produce a challenge key 52. The exchange key may be combined with the pass key using a cryptographic hash function of varying bit lengths, such as a 128-bit hash function using the MD5 algorithm, or a 256-bit hash function using the SHA-1 algorithm. Other cryptographic hash functions with varying bit sizes and algorithms could also be used as understood in the art. The pass key may be stored in the client device 42, or in a preferred embodiment, the pass key, may be generated by processing logic 54 at the client device 42. Processing logic 54 may generate the pass key, for example, by combining a user entered password 56 with a locally stored seed key 58. The user entered password 56 may be combined with the locally stored seed key 58 by similarly using a cryptographic hash function. The client device 42 sends the challenge key 52 produced back to the industrial controller 12. By sending back what is essentially a hashed password with random data, i.e. the challenge key 52, the actual password may be sufficiently disguised before passing over the network.

Meanwhile, the industrial controller 12 combines the exchange key 50 with a locally stored pass key 62 to produce an authentication code 64. In an initial state, the locally stored pass key 62 may be set to a default value that may be derived by the client device 42. The exchange key 50 may be combined with the locally stored pass key 62 by similarly using a cryptographic hash function. The industrial controller 12 then compares 66 the challenge key 52 received from the client device 42 to the authentication code 64 to determine a match between the challenge key 52 and the authentication code 64. The industrial controller 12 then allows further access 68 by the client device 42 using CIP if a successful match between the challenge key 52 and the authentication code 64 is determined. Conversely, the industrial controller 12 prevents further access 70 by the client device 42 if a failed match between the challenge key 52 and the authentication code 64 is determined Upon successful match between the challenge key 52 and the authentication code 64, the client device 42 may alter a control program in the industrial controller 12 for controlling the industrial process or machines 24. Applying this two-factor authentication procedure, including a real-time randomly generated exchange key and a user derived pass key, advantageously avoids actual passwords from passing over the network and advantageously requires real-time authentication thereby preventing future playback of recorded transactions. Further yet, the depth of security employed may be scalable to the extent that time and processing power allow.

In a preferred embodiment, additional security measures may be taken to reduce even further the probability of accidental and/or unauthorized intrusion. The exchange key 50 may be kept valid for combining with a locally stored pass key 62 to produce an authentication code 64 for only a predetermined amount of time, such as 30 seconds, thereby defeating any possible subsequent playback of recorded transactions. Also, the industrial controller 12 may be configured to add delay for a predetermined amount of time, such as 1 second, after sending the exchange key to the client device, thereby limiting the total number of attempts possible by the client device 42. Also, the industrial controller 12 may be configured to no longer send the exchange key 50 to the client device 42 after a predetermined number of failed matches between the challenge key 52 and the authentication code 64 has been reached, thereby defeating a brute force attack relying on attempting numerous different keys.

Figure 3:
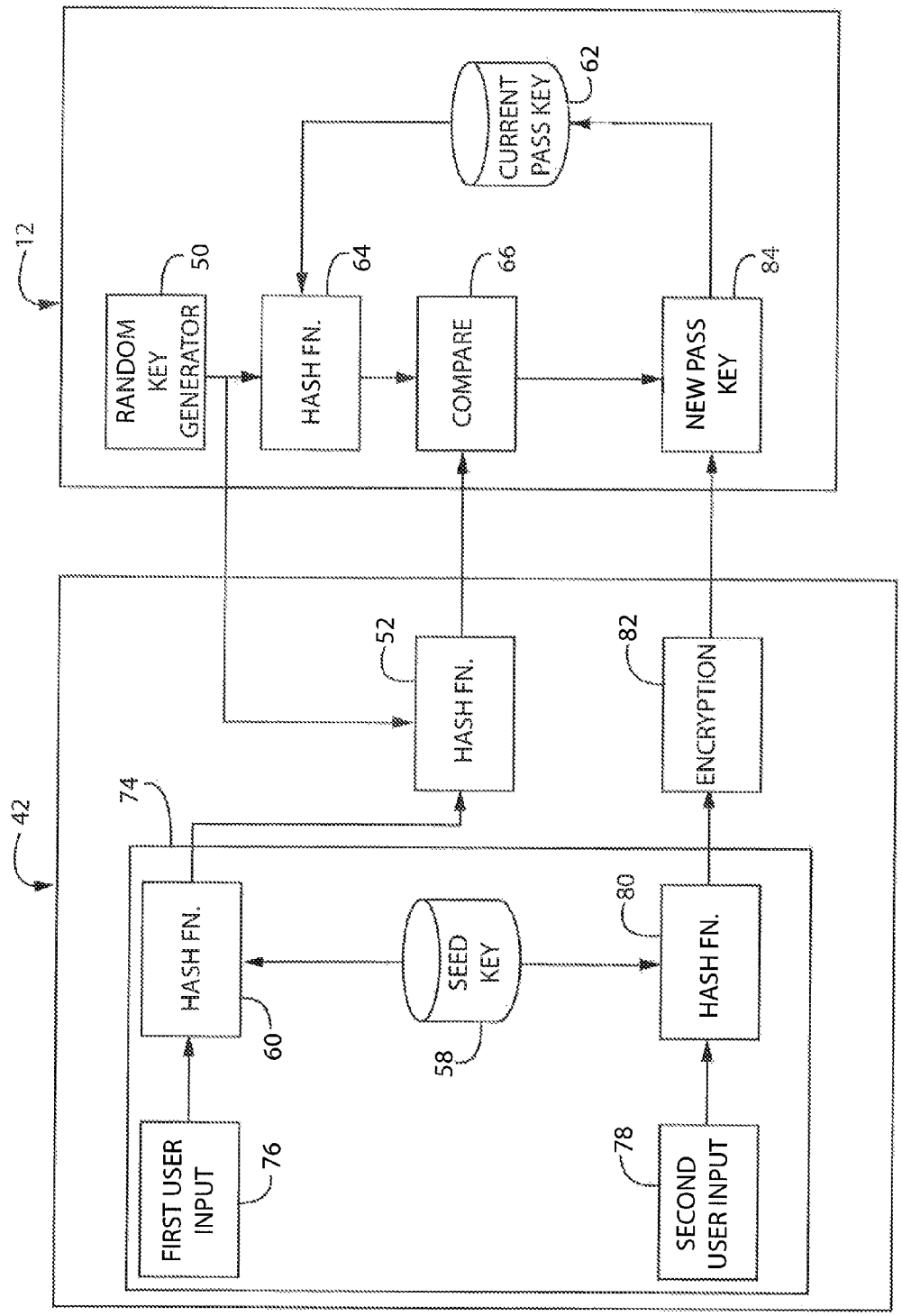
FIG. 3 is a logical diagram of a client device replacing a locally stored pass key contained in an industrial controller in accordance with an embodiment of the present invention.

Referring now to FIG. 3, a logical diagram of a client device replacing a locally stored pass key contained in an industrial controller in accordance with an embodiment of the present invention is shown. An advantage hereof is to provide a replacement pass key to the industrial controller without the pass key appearing in a comprehensible form while it is being transmitted.

Similar to that described above with respect to FIG. 2, the client device 42 may begin by initiating a transaction to the industrial controller 12 which requests access. In a preferred embodiment, the client device 42 may also indicate that it intends to replace the locally stored pass key in the same transaction. In response, the industrial controller 12 may randomly generate an exchange key 50 and send the exchange key to the client device 42, in addition to combining the exchange key 50 with the locally stored pass key 62 to produce an authentication code 64 (using a cryptographic hash function). Once again, the client device 42 combines the exchange key with a pass key to produce a challenge key 52 (using a cryptographic hash function), which the client device 42 sends back to the industrial controller 12. Similar to that described above with respect to FIG. 2, processing, logic 74 may generate the pass key, for example, by combining a first user entered password 76 with a locally stored seed key 58 (using a cryptographic hash function).

In addition, the client device 42 may also generate an encrypted replacement pass key 82, which the client device 42 sends back to the industrial controller 12, and which may be sent back concurrently with the challenge key 52. The encrypted replacement pass key 82 may be produced, for example, by the processing logic 74 combining a second user entered password 78 with the locally stored seed key 58 (using a cryptographic hash function), which output may be then encrypted by a predetermined encryption algorithm known by both the client device 42 and the industrial controller 12. In a preferred embodiment, the default value for the locally stored pass key 62 (in an initial state) known by both the client device 42 and the industrial controller 12 may be used to encrypt and decrypt the replacement pass key.

The industrial controller 12 may then compare 66 the challenge key 52 received from the client device 42 to the authentication code 64 to determine a match between the challenge key 52 and the authentication code 64. If a successful match between the challenge key 52 and the authentication code 64 is determined, the industrial controller 12 may then decrypt the encrypted replacement pass key 82 to produce a decrypted replacement pass key 84, which may override the locally stored pass key 62. This may be in addition to allowing other accesses to the client device 42 using CIP. Conversely, the industrial controller 12 may disregard the encrypted replacement pass key 82 if a failed match between the challenge key 52 and the authentication code 64 is determined.

Figure 4:
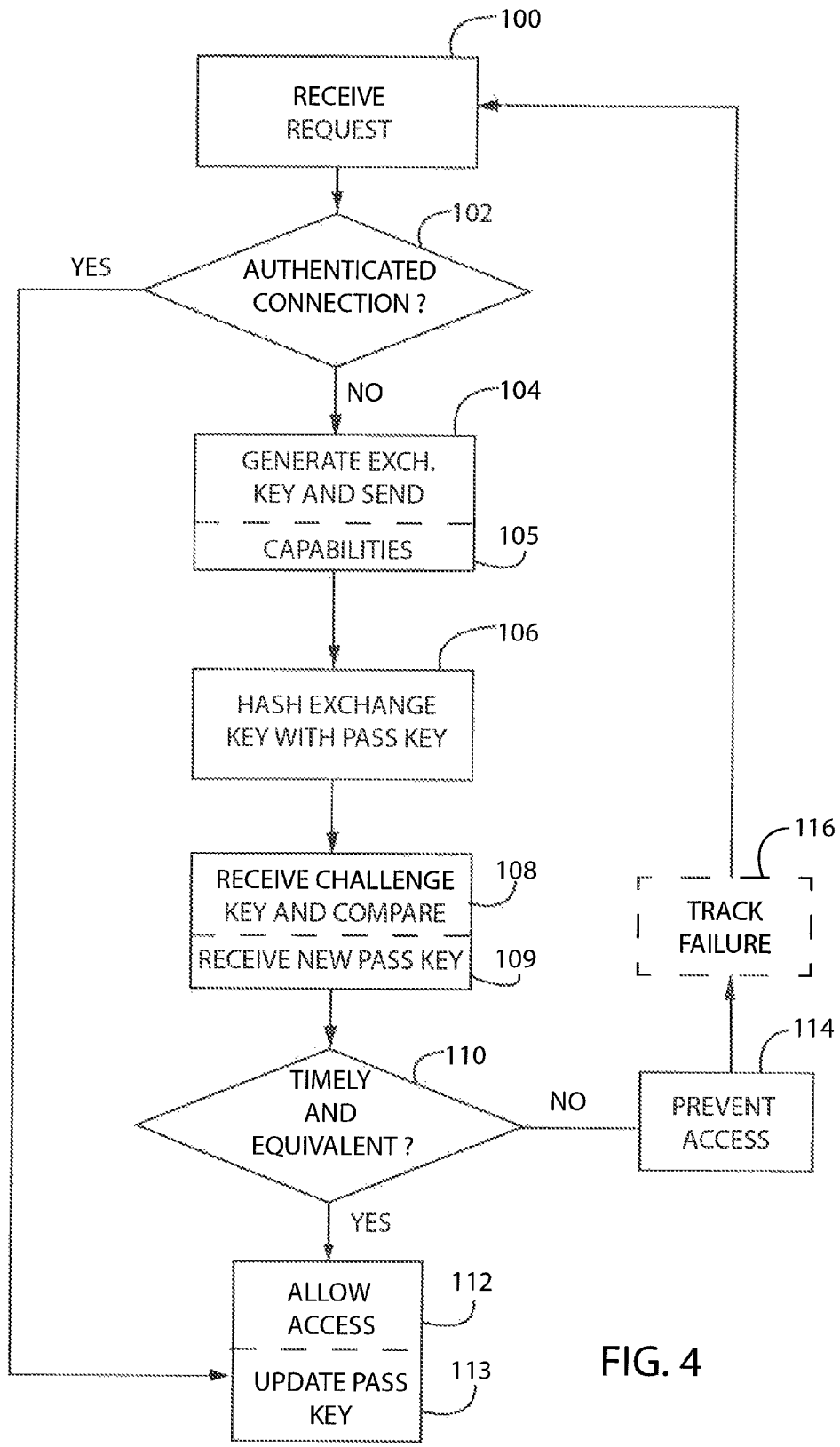
FIG. 4 is a flowchart illustrating embodiments of the present invention.

FIG. 4 is a flowchart illustrating alternative embodiments of the present invention. In block 100 and industrial controller may await and receive a transaction request from a client device. Upon receiving the transaction request, in decision block 102, the industrial controller may then determine whether an authenticated CIP connection ID exists for the requesting client device. If an authenticated CIP connection ID exists, the industrial controller may immediately allow access to the client device using CIP in block 112, and less a more enhanced security is required. If an authenticated CIP connection ID does not exist, in block 104 the industrial controller may randomly generate an exchange key and send the exchange key to the client device in response to the transaction request originating from the client device. In addition, in optional block 105, the industrial controller may identify the cryptographic capabilities of the client device based on information contained in the transaction request originating from the client device, and optionally send identification of the strongest cryptographic capability supported by both the industrial controller and the client device from the information contained in the transaction request.

Next, in block 106 the industrial controller combines the exchange key with a locally stored pass key to produce an authentication code. Then, in block 108, the industrial controller awaits receipt and receipts the challenge key, then compares the challenge key received from the client device to the authentication code to determine a match between the challenge key and the authentication code. In addition, in optional block 109, the industrial controller may receive an encrypted replacement pass key from the client device and apply a decryption algorithm to produce a decrypted replacement pass key. In decision block 110, if the industrial controller determines a successful match between the challenge key and the authentication code (and optionally if the industrial controller determines that the challenge key was timely received before expiring the exchange key), the industrial controller may allow the client device to further access the industrial controller using CIP in block 112. In addition, in optional block 113, the industrial controller may replace the locally stored pass key with the decrypted replacement pass key.

If, however, in decision block 110 the industrial controller determines a failed match between the challenge key and the authentication code, the industrial controller may prevent the client device from further accessing the industrial controller in block 114. In addition, an optional block 116, the industrial controller may track the date, time, address, location, transaction information and any other data related to the failure. Next, returning back to block 100, the industrial controller again awaits receipt of a transaction request from a client device. If the same client device previously having a failure initiates another transaction request, the industrial controller may immediately prevent access, depending on the total number of failures and/or the number of failures within a given period of time that the industrial controller is configured to permit.

Figure 5:
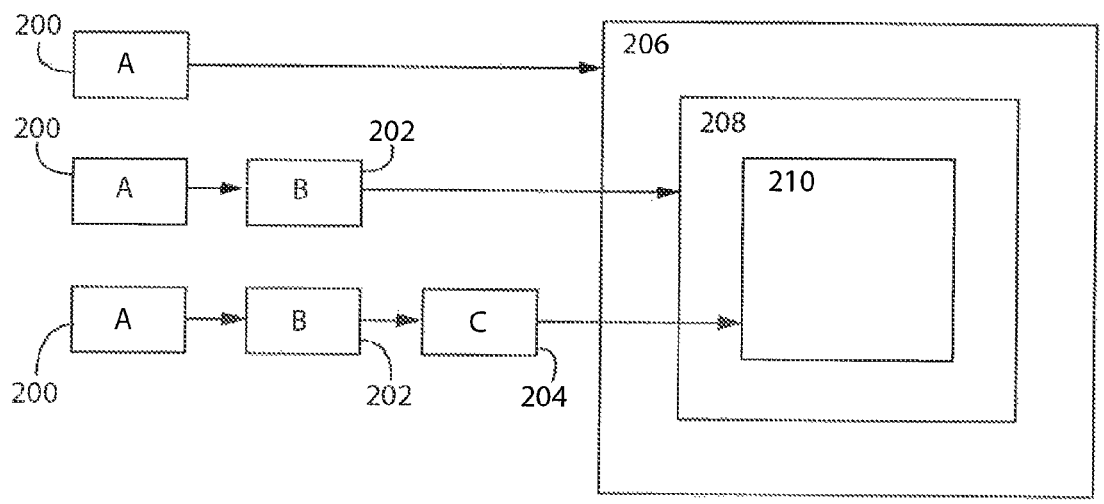
FIGS. 5-6 are logical diagrams illustrating varying levels of access using a plurality of locally stored pass keys in accordance with embodiments of the present invention.
Figure 6:
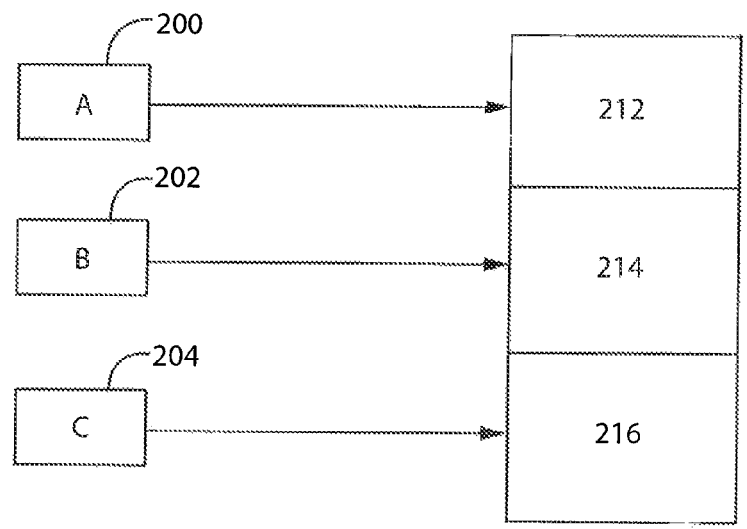

FIGS. 5-6 are logical diagrams illustrating varying levels of access using a plurality of locally stored pass keys in accordance with embodiments of the present invention. As shown in FIG. 5, for example, a first authentication "A," similar to that described above with respect to FIG. 2, may be sufficient to allow the client device 42 to access a first set of functionality 206. However, the first authentication "A" need not provide access to all functionality. A second authentication "B" may instead be required to further access a second set of functionality 208. In other words, the second set of functionality 208 cannot be accessed unless both the first authentication "A" and the second authentication "B" are each successful. This may be equivalent to requiring a second user password and a second locally stored pass key to enter a second area after passing the first area Similarly, a third authentication "C" may be>required to further access a third set of functionality 210. Alternatively, as shown in FIG. 6, for example, accessible functionality may be linearly partitioned, such that a first authentication "A" may allow access to a first set of functionality 212, a second authentication "B" may allow access to a second set of functionality 214, and a third authentication "C" may allow access to a third set of functionality 216, each without requiring any additional authentication. As such, varying levels and combinations of access may be provided accordingly.

Certain terminology is used herein for purposes of reference only, and thus is not intended to be limiting. For example, the terms "first," "second" and other such numerical terms do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a processor" and "the processor" can be understood to include one or more microprocessors or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial controller with a processor executing a program stored in a non-transitory computer-readable storage medium wherein the program instructs the processor to perform the following steps:
   (a) in response to a transaction request to the industrial controller from a client device, determine if an authenticated common industrial protocol (CIP) connection has been established with the client device, and allow further access to the industrial controller by the client device if an authenticated CIP connection has been established:
   (b) if an authenticated CIP connection has not been established, randomly generate an exchange key and send the exchange key to the client device in response to the transaction request;
   (c) combine the exchange key with a locally stored pass key to produce an authentication code; and
   (d) compare a challenge key received from the client device to the authentication code to determine a match between the challenge key and the authentication code;
   wherein a successful match between the challenge key and the authentication code allows the client device to further access the industrial controller using a CIP connection.

2. The industrial controller of claim 1, wherein the exchange key is combined with the locally stored pass key using a cryptographic hash function.

3. The industrial controller of claim 2, wherein the cryptographic hash function is MD5.

4. The industrial controller of claim 2, wherein the cryptographic hash function is SHA-1.

5. The industrial controller of claim 1, wherein the industrial controller communicates with the client device over a Universal Serial Bus (USB) network.

6. The industrial controller of claim 1, wherein the industrial controller communicates with the client device over an Ethernet network.

7. The industrial controller of claim 1, wherein the industrial controller communicates with a plurality of I/O modules over a. control network using a CIP connection to thereby control an industrial process.

8. The industrial controller of claim 7, wherein after a successful match between the challenge key and the authentication code, the client device is allowed to alter a control program for controlling the industrial process.

9. The industrial controller of claim 7, wherein the client device and the plurality of I/O modules are on the same control network.

10. The industrial controller of claim 9, wherein the control network is an EtherNet/IP network.

11. The industrial controller of claim 1, wherein the industrial controller adds delay for a predetermined amount of time after sending the exchange key to the client device.

12. The industrial controller of claim 1, wherein the exchange key is valid for combining with a locally stored pass key to produce the authentication code for only a predetermined amount of time.

13. The industrial controller of claim 1, further comprising the step of no longer sending an exchange key to the client device after a predetermined number of failed matches between the challenge key and the authentication code.

14. The industrial controller of claim 1, further comprising the following steps:
   (a) applying a decryption algorithm on an encrypted replacement pass key received from the client device to produce a decrypted replacement pass key: and
   (b) replacing the locally stored pass key with the decrypted replacement pass key following a successful match between the challenge key and the authentication code.

15. The industrial controller of claim 1, wherein the industrial controller identifies cryptographic capabilities of the client device based on information contained in the transaction request originating from the client device.

16. The industrial controller of claim 15, wherein the industrial controller sends to the client device identification of the strongest cryptographic capability supported by both the industrial controller and the client device based on the information contained, in the transaction request originating from the client device.

17. The industrial controller of claim 1, wherein the further access to the industrial controller using a CIP connection is not the complete available access.

18. The industrial controller of claim 17, wherein the industrial controller combines an exchange key with a different locally stored pass key to produce a different authentication code, wherein a successful match between the challenge key and the different authentication code allows the client device to further access different functionality of the industrial controller using a common industrial protocol.

19. A secure method for communicating with an industrial controller comprising:
   (a) in response to a transaction request to the industrial controller from a client device, determining if an authenticated common industrial protocol (CIP) connection has been established with the client device, and allowing further access to the industrial controller by the client device if an authenticated CIP connection has been established;
   (b) if an authenticated CIP connection has not been established, randomly generating an exchange key and sending the exchange key to the client device in response to the transaction request;
   (c) combining the exchange key with a locally stored pass key to produce an authentication code;
   (d) comparing a challenge key received from the client device to the authentication code to determining a match between the challenge key and the authentication code; and
   (e) allowing the client device to further access the industrial controller using a CIP connection following a successful match between the challenge key and the authentication code.

20. The method of claim 19, further comprising:
(a) applying a decryption algorithm on an encrypted replacement pass key received from the client device to produce a decrypted replacement pass key; and
(b) replacing the locally stored pass key with the decrypted replacement pass key following a successful match between the challenge key and the authentication code.

\* \* \* \* \*